United States Patent [19]

Sugita et al.

[11] Patent Number: 4,865,465
[45] Date of Patent: Sep. 12, 1989

[54] HYDROSTATICALLY SUPPORTING DEVICE FOR SLIDE

[75] Inventors: Kazuhiko Sugita, Anjo; Kazuhisa Sugiyama, Okazaki; Yasumasa Nakane, Takahama, all of Japan

[73] Assignee: Toyoda Koki Kabushiki Kaisha, Kariya, Japan

[21] Appl. No.: 233,748

[22] Filed: Aug. 19, 1988

[30] Foreign Application Priority Data

Aug. 20, 1987 [JP] Japan ................. 62-207292
Oct. 14, 1987 [JP] Japan ................. 62-156174[U]

[51] Int. Cl.$^4$ ........................... F16C 32/06
[52] U.S. Cl. ........................... 384/12; 384/13
[58] Field of Search ............ 384/12, 13, 100, 120

[56] References Cited

U.S. PATENT DOCUMENTS 3,903,993  9/1975  Vorrhees et al. ............ 384/12
4,653,408  3/1987  Nagashima et al. ......... 384/12
4,746,227  5/1988  Sato .............................. 384/13

FOREIGN PATENT DOCUMENTS 60-108241  6/1985  Japan.
61-209834  9/1986  Japan.

Primary Examiner—Thomas R. Hannon
Attorney, Agent, or Firm—Oblon, Spivak, McClelland, Maier & Neustadt

[57] ABSTRACT

A slide guided on a guiding member has at least one sliding surface in slidable engagement with a guiding surface of the guiding member. The at least one sliding surface is formed with an elongate supply grove extending in the sliding direction of the slide and is also formed with a plurality of hydrostatic pressure pockets arranged in the sliding direction of the slide. The slide is formed therein with passages which respectively provide fluid communications of the hydrostatic pressure pockets with the elongate supply groove, and a plurality of throttle elements are respectively fitted in the passages at portions of the same opening to the hydrostatic pressure pockets. A supply passage connected to an oil supply is formed in the guiding member and at the guiding surface, opens to the elongate supply groove for always communicating with the elongate supply groove irrespective of the sliding position of the slide.

12 Claims, 7 Drawing Sheets

HYDROSTATICALLY SUPPORTING DEVICE FOR SLIDE

BACKGROUND OF THE INVENTION

1. Field of the Invention:

The present invention relates to a device for hydrostatically supporting a slide on a guiding base or member. More particularly, it relates to such a device suitable for application to hydrostatically supported sliding tables of machine tools.

2. Discussion of the Prior Art:

In hydrostatic slide supporting device of this kind, a slide is slidably guided on a guiding surface of a guiding base usually fixed. Hydrostatic pressure pockets are formed on a sliding surface of the slide, and pressurized lubrication oil is admitted into the pressure pockets to hydrostatically support the slide. However, in order to conduct lubrication oil to the pressure pockets, there is used a flexible conduit connected to the slide, as disclosed in Japanese Unexamined Pat. Publication No. 61-209834, for example.

In the prior art device, the slide suffers an undesirable force which occurs with the deformation of the flexible conduit. Because the force largely varies during the sliding movement of the slide, it is difficult to highly maintain the accuracy in the sliding movement of the slide.

SUMMARY OF THE INVENTION

Accordingly, it is an object of the present invention to provide a hydrostatic slide supporting device capable of conducting pressurized lubrication fluid into pressure pockets formed on a sliding surface of a slide, without using any flexible conduit or the like.

Another object of the present invention is to provide a hydrostatic slide supporting device in which any flexible conduit for conducting pressurized lubrication fluid to fluid pockets formed on a sliding surface of a slide is not used to prevent any undesirably force from being applied by any such flexible conduit to the slide.

Briefly, in a hydrostatic slide supporting device according to the present invention, a slide is formed at its sliding surface with a plurality of hydrostatic pressure pockets which are arranged in the sliding direction of the slide. The sliding surface of the slide is further formed with an elongate supply groove extending in the sliding direction of the slide and a first passage for providing fluid communications of the pressure pockets with the elongate groove. Further a guiding base for slidably supporting the slide is formed therein with a second passage connected to a lubrication fluid supply. The second passage opens at a guiding surface of the guiding base on which the slide is movable. The position in the sliding direction of the slide at which the second passage opens is such that the second passage always communicates with the elongate supply groove irrespective of the sliding position of the slide.

With this configuration, pressurized lubrication fluid conducted to the second supply passage from the lubrication fluid supply is conducted into the elongate groove and therefrom, is distributed to the hydrostatic pressure pockets through the first supply passage formed in the slide. Thus, any flexible conduit or the like is no longer required for leading pressurized lubrication fluid from the guiding base to the slide, so that it can be avoided that the flexing or deformation of any such conduit applies an undesirable force on the slide during the sliding movement.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENTS

Figure 1:
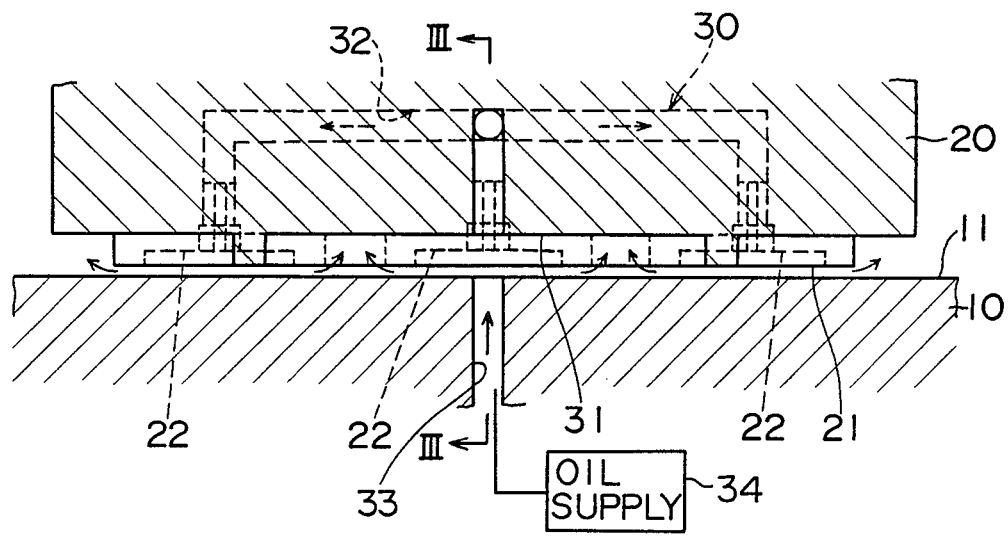
FIG. 1 is a longitudinal sectional view of a hydrostatic slide supporting device according to the present invention.
Figure 2:
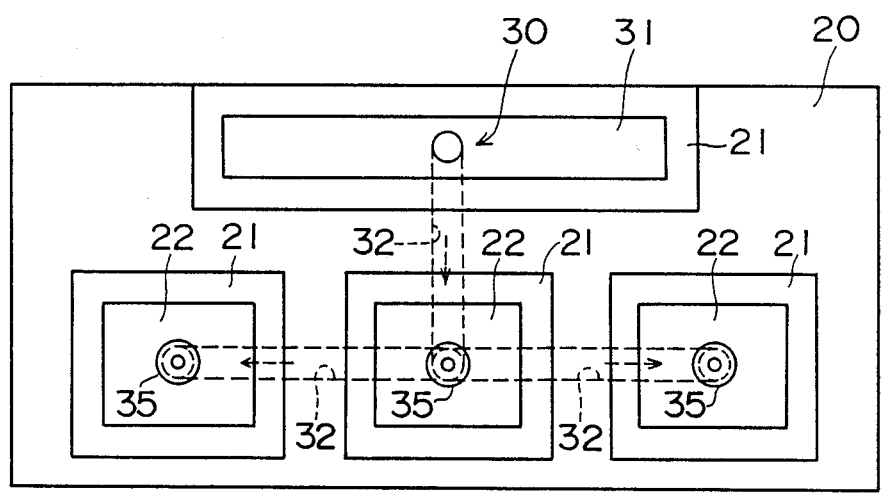
FIG. 2 is a bottom view of a sliding surface of a slide shown in FIG. 1.
Figure 3:
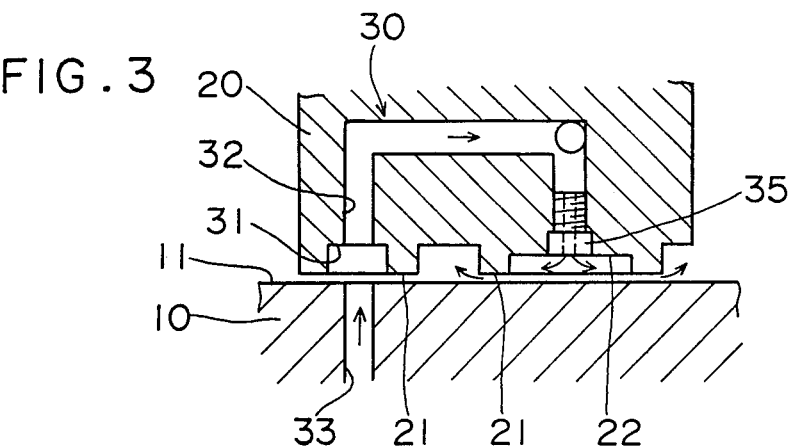
FIG. 3 is a cross-sectional view of the device, taken along the line III—III in FIG. 1.

Referring now to the drawings and particularly, to FIGS. 1-3 thereof showing a first embodiment of the present invention, a guiding member or base 10 is formed with a flat guiding surface 11, on which a slide 20 is slidably guided at a sliding surface 21 thereof. Plural (preferably, two) pairs of such guiding and sliding surfaces 11 and 21 may be provided as shown for example in FIGS. 9-11, so that the slide 20 can be guided by the guiding base 10 to be slidable in only one direction (the left-right direction as viewed in FIGS. 1 and 2).

As best shown in FIG. 2, the sliding surface 21 is formed with three large hydrostatic pressure pockets 22 of rectangular shape which are arranged at predetermined intervals in the sliding direction of the slide 20 and is further formed with an elongate supply groove 31 which extends alongside the hydrostatic pressure pockets 22 (i.e., in the same direction as the sliding movement of the slide 20). The supply groove 31 has substantially the same length as the moving stroke of the slide 20. The slide 20 is formed therein with a first passage 32 which branches off to permit the hydrostatic pressure pockets 22 to communicate with the supply groove 31, and the branch portions thereof are provided at their respective distal ends with throttle elements 35 for respectively controlling the hydrostatic pressures of pressurized lubrication oil admitted in the pockets 22, independently of one another. In the illustrated embodiment, the sliding surface 21 is divided into those land portions respectively encircling the hydrostatic pressure pockets 22 and another land portion encircling the supply groove 31. More specifically, the sliding surface land portions 21 are respectively defined by rectangular walls which extend downward from the lower surface of the slide 20, and the rectangular walls have substantially the same uniform thickness as one another. In the guiding base 10, there is formed a second passage 33, one end of which opens to the guiding surface 11 at such a position that the second passage 33 is allowed to always communicate with the supply groove 31 irrespective of the sliding position of the slide 20. The second passage 33, the supply groove 31 and the first passage 32 constitute oil passage means 30 for conducting pressurized lubrication oil into the hydrostatic pressure pockets 22.

Lubrication oil which is supplied to the second passage 33 from a lubrication oil supply 34 is admitted into the supply groove 31 whatever position the slide 20 takes within the sliding stroke, and then, is admitted into each of the hydrostatic pockets 22 through the first passage 32 and an associated one of the throttle elements 35. The lubrication oil admitted into the hydrostatic pockets 22 slidably supports the slide 20 against the guiding base 10 with the hydrostatic pressure thereof and is drained by way of a clearance between the sliding surface portion 21 around each hydrostatic pocket 22 and the guiding surface 11. Although a part of lubrication oil is also drained through between the sliding surface portion 21 around the supply groove 31 and the guiding surface 11, the volume of such a part of lubrication oil is not so much.

Figure 4:
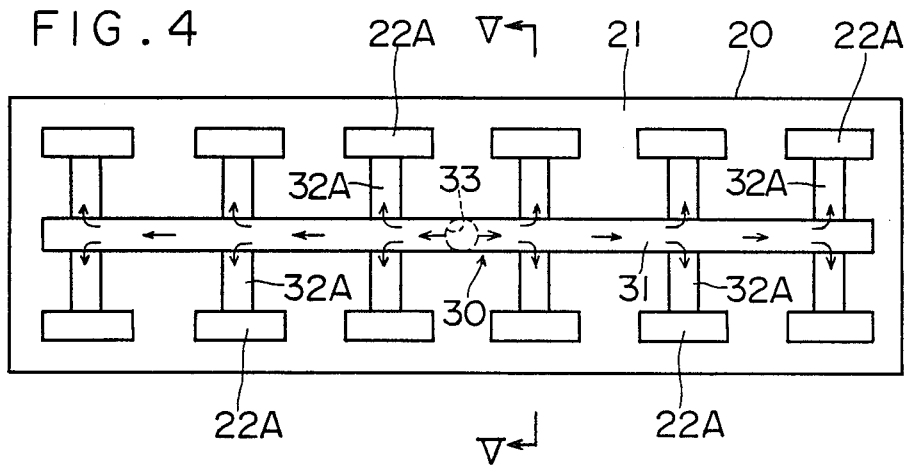
FIG. 4 is a bottom view of a sliding surface of a slide in a second embodiment according to the present invention.
Figure 5:
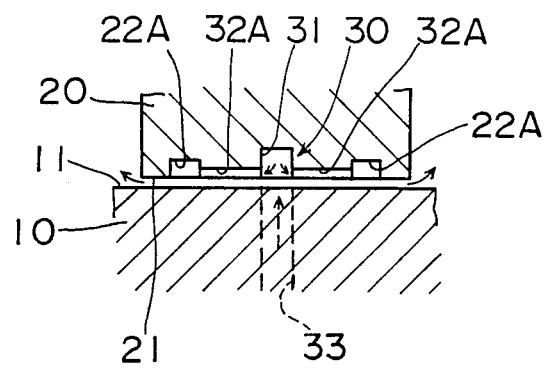
FIG. 5 is a cross-sectional view of the second embodiment, taken along the line V—V in FIG. 4.

Referring then to FIGS. 4 and 5, there is shown a second embodiment, in which an elongate supply groove 31 is arranged to extend at the center of the sliding surface 21, and six small hydrostatic pockets 22A of rectangular shape are arranged at predetermined intervals alongside the supply groove 31 at both sides thereof. This embodiment is the same as the first embodiment except that first passages 32A which respectively allow the hydrostatic pockets 22A to communicate with the supply groove 31 are formed not in the slide 20, but on the sliding surface 21 and that every part of the lower surface of the slide 20 except for the supply grooves 31, the hydrostatic pockets 22A and the first passages 32A constitute a single flat surface. Each of the first passages 32A has a relatively small cross-section thereby to act as the throttle element 35 described in the first embodiment. The first passages 32A, the supply groove 31 and the second passage 33 constitute an oil passage means 30. Since other respects in configuration of the second embodiment are the same as those of the first embodiment, corresponding parts are designated by the same reference numerals to avoid further detail description.

The second embodiment is simplified in construction and is reduced in manufacturing cost, compared with the first embodiment. However, in the second embodiment, the degree to which the hydrostatic pressure within the hydrostatic pressure pockets 22A varies in connection with the variation of the clearance between the guiding surface 11 and the sliding surface 21 is diminished, so that the supporting rigidity is decreased.

Figure 6:
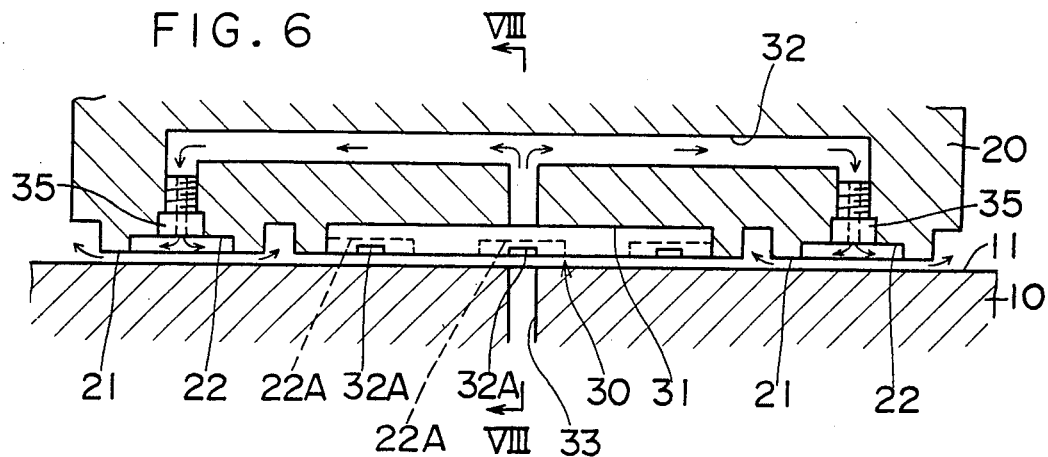
FIG. 6 is a longitudinal sectional view of a third embodiment according to the present invention.
Figure 7:
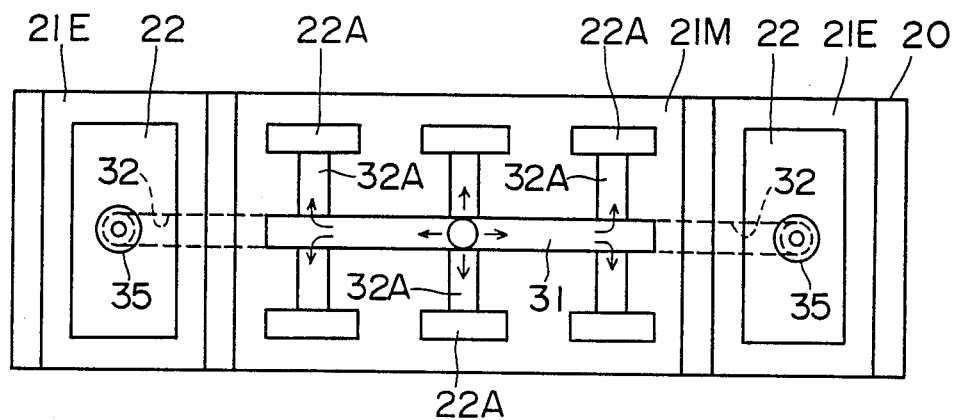
FIG. 7 is a bottom view of a sliding surface of a slide in the third embodiment.
Figure 8:
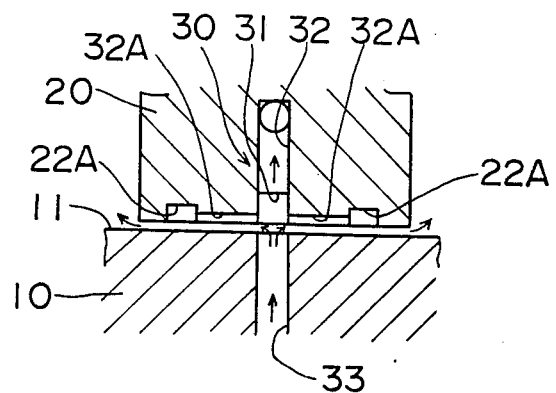
FIG. 8 is a cross-sectional view of the third embodiment, taken along the line VIII—VIII in FIG. 6.

In a third embodiment shown in FIGS. 6–8, like the second embodiment, plural small hydrostatic pressure pockets 22A are formed on a mid portion 21M of a sliding surface 21 at both sides of an elongate supply groove 31 so as to be supplied with lubrication oil from the elongate supply groove 31 through respective first passages 32A. In addition, a pair of large hydrostatic pressure pockets 22 each shown in the first embodiment are formed inside a pair of end portions 21E of the sliding surface 21 located at the opposite end portions of the slide 20 so as to be supplied with lubrication oil from the supply groove 31 through respective second passages 32 and throttle elements 35. The end portions 21E of the sliding surface 21 are at the same height as the mid portion 21M, and walls encircling the end portions 21E have substantially the same uniform thickness as each other. Other details of the configuration of the third embodiment are the same as those of the first and second embodiments, so that same reference numerals are used to designate the corresponding parts.

Figure 10:
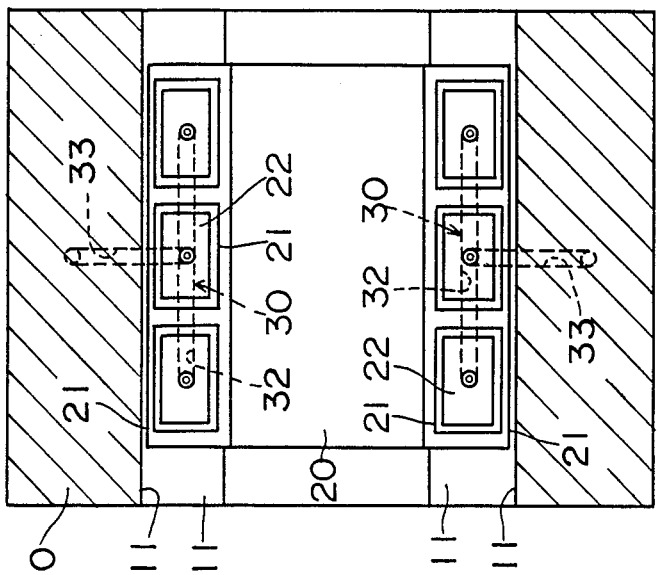
FIG. 10 is a plan view partly in section, as viewed along the line X—X in FIG. 9.
Figure 9:
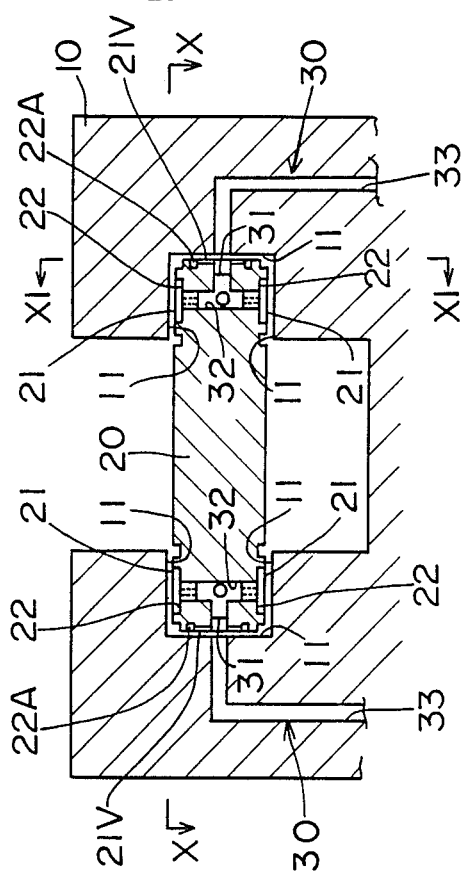
FIG. 9 is a cross-sectional view of a fourth embodiment according to the present invention.
Figure 11:
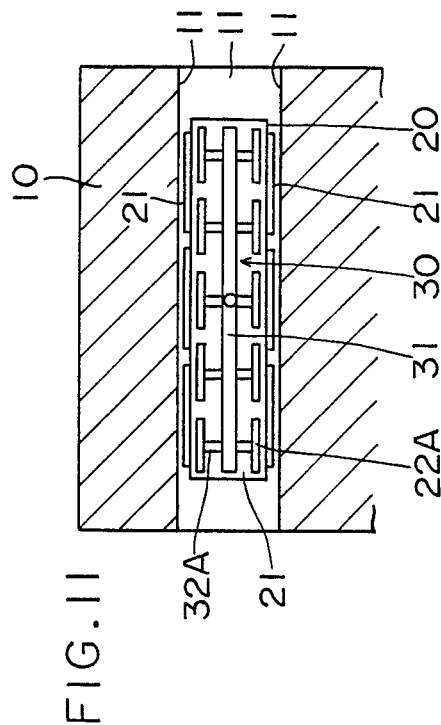
FIG. 11 is a sectional view of the fourth embodiment, taken along the line XI—XI in FIG. 9.

FIGS. 9 through 11 show a fourth embodiment of the invention which practices the first and second embodiments in combination. As best shown in FIG. 9, each of the both sides of the slide 20 is formed with sliding surfaces 21 respectively at upper, lower and lateral surfaces thereof, while three guiding surfaces 11 which respectively face three sliding surfaces 21 at the corresponding side of the slide 20 are arranged at each of the both sides of the guiding base 10 in the U-letter shape. Each of the lateral sliding surfaces 21V is formed with a supply groove 31 which extends at the center thereof, and plural hydrostatic pressure pockets 22A as described in the aforementioned second embodiment are arranged alongside the supply groove 31 at each of upper and lower sides thereof. Pressurized lubrication oil supplied to a second passage 33 from an oil supply (not shown) is admitted into the supply groove 31, then is conducted to the upper and lower pressure pockets 22 to perform hydrostatical support in the vertical direction, and is also conducted to the upper and lower hydrostatic pockets 22A through the first oil passages 32A so as to perform hydrostatic support in the direction transverse to the sliding direction of the slide 20.

Consequently, when a load in the vertical direction is applied to the slide 20, either the upper clearance or the lower clearance between the guiding base 10 and the slide 20 is decreased, in which event the hydrostatic pressure within the hydrostatic pressure pockets 22 which open to the clearance being decreased is heightened to generate a counterforce against the load. Likewise, when a load in the left-right direction in FIG. 9 is applied to the slide 20, the hydrostatic pressure within the hydrostatic pressure pockets 22A which are arranged at one of the lateral siding surfaces 21V is heightened to generate a counterforce against the load.

In the embodiment shown in FIGS. 9 through 11, the hydrostatic pressure pockets 22 and the first passages 32 described in the first embodiment are arranged for the slide support in the vertical direction which requires for a large supporting rigidity, while the hydrostatic pressure pockets 22A and the first passages 32A described in the relatively simple second embodiment are arranged for the slide support in the horizontal direction which does not require so large supporting rigidity as in the vertical direction.

According to each of the aforementioned embodiments, it is not only possible to hydrostatically support the slide 20 on the guiding base 10, but also possible to enhance the guiding accuracy of the slide 20 because any flexible conduit or the like for conducting the pressurized lubrication oil to the hydrostatic pressure pockets 22, 22A is no longer necessary to be connected to the slide 20, thereby advantageously avoiding that any undesirable force which adversely works on the smooth movement of the slide 20 is applied to the slide 20.

Figure 12:
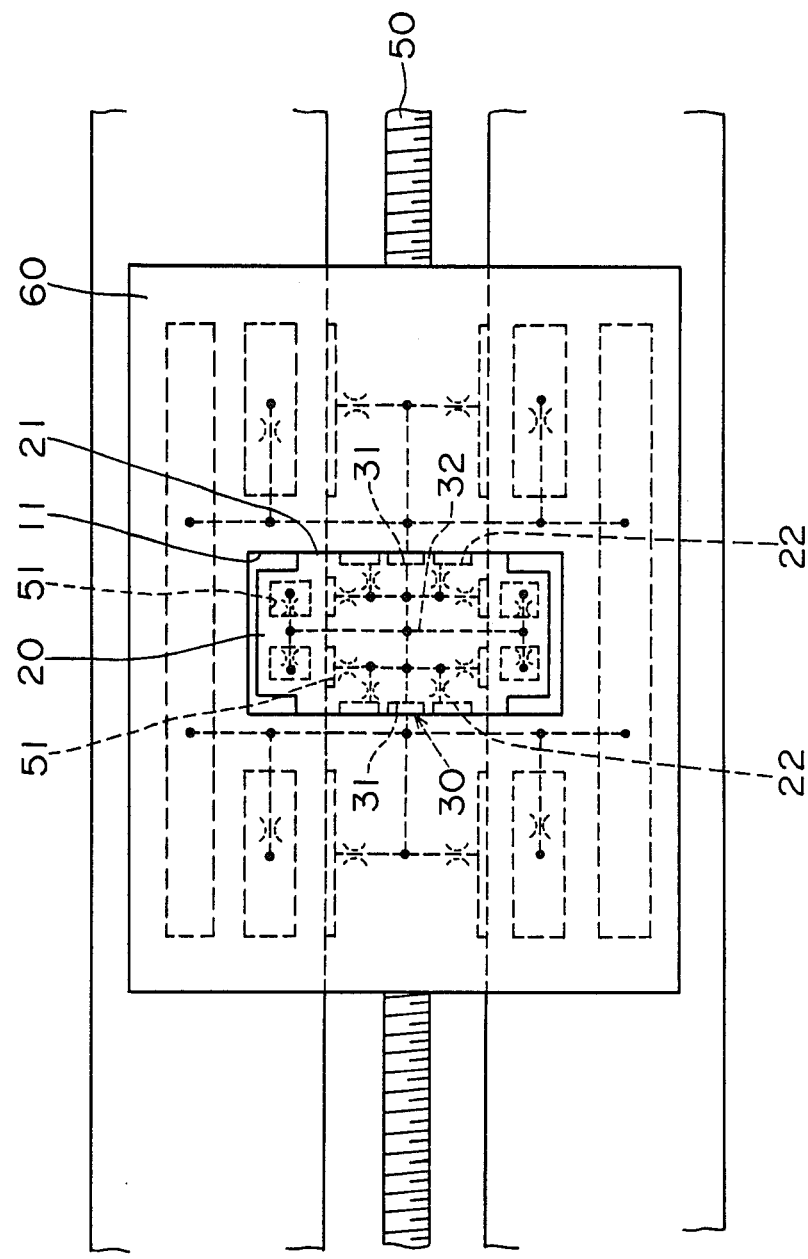
FIG. 12 is a plan view of a fifth embodiment according to the present invention.

It is to be noted that the present invention may be applied to a double sliding table mechanism according to a fifth embodiment of the present invention, wherein rotational movement of a ball screw 50 is translated by a nut (not shown) into the linear movement of a slide (sub-table) 20, which is then transmitted to a guided member (main table) 60, as shown in FIG. 12. In this embodiment, thrust surfaces of the subtable 20 which are located at opposite ends in the moving direction of the subtable 20 are respectively formed with supply grooves 31, from which pressurized lubrication oil is conducted to a plurality of hydrostatic pressure pockets 22, 51 of the subtable 20 through a first supply passage 32.

Figure 13:
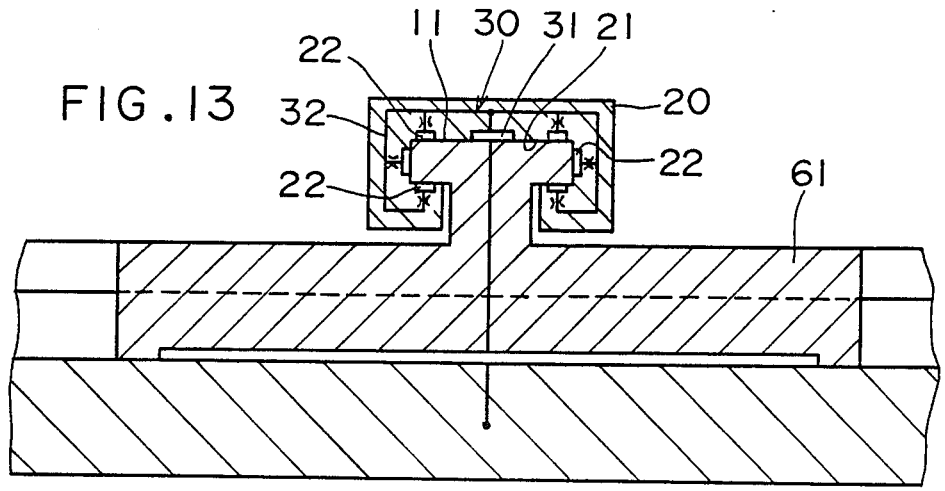
FIG. 13 is a fragmentary cross-sectional view of a sixth embodiment according to the present invention.
Figure 14:
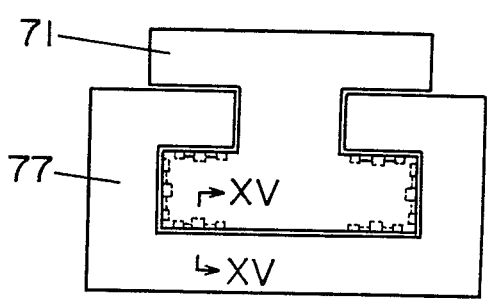
FIG. 14 is an elevational view of a seventh embodiment according to the present invention.
Figure 17:
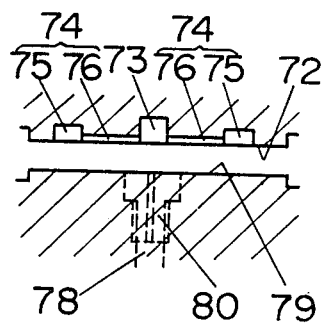
FIG. 17 is a cross-sectional view, taken along the line XVII—XVII in FIG. 15.
Figure 15:
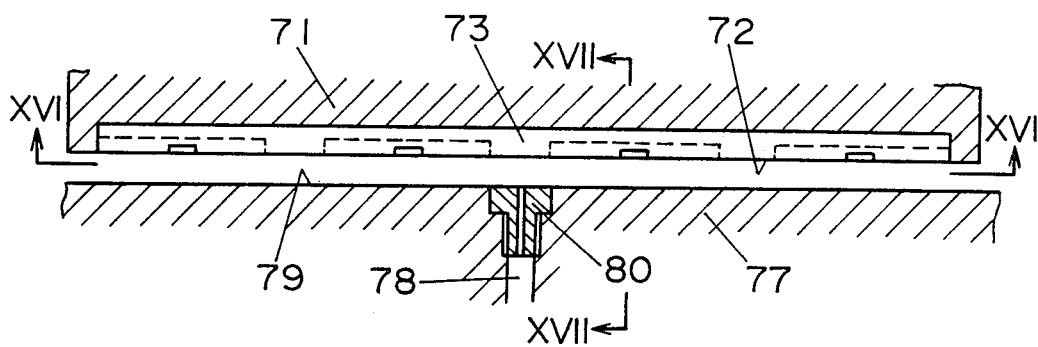
FIG. 15 is a longitudinal sectional view of the seventh embodiment, taken along the line XV—XV in FIG. 14.

The present invention may also be applied to a two-orthogonal axis table mechanism according to a sixth embodiment of the present invention, wherein a sliding member (Y-axis table) 20 is slidably guided on another sliding member (X-axis table) 61, which is in turn slidably guided on a guiding base (not numbered), as shown in FIG. 13. In this embodiment, a supply groove 31 is formed on the Y-axis table 20, and pressurized lubrication oil is supplied from the supply groove 31 to a plurality of hydrostatic pressure pockets 22 also formed on the Y-axis table 20.

Figure 16:
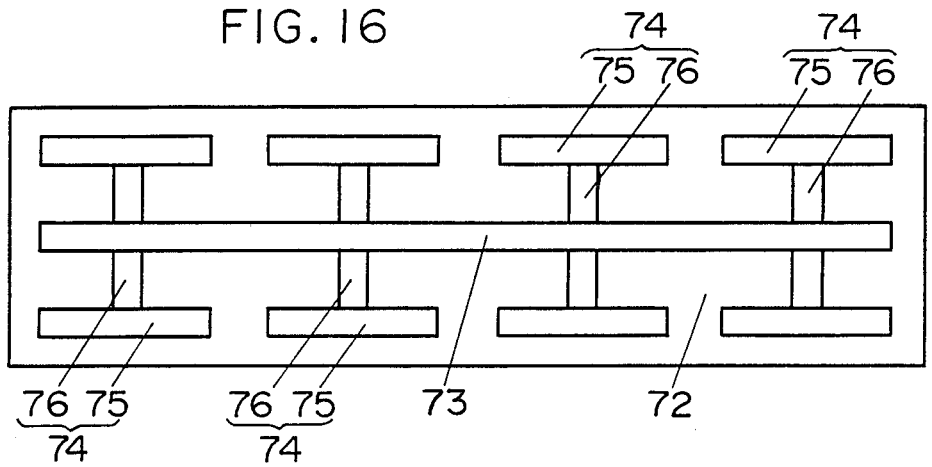
FIG. 16 is a bottom view of a sliding surface of a slide, as viewed along the line XVI—XVI in the FIG. 15.

Referring then to FIGS. 14-17 illustrating a seventh embodiment of the present invention, a slide 71 is formed at each of six sliding surfaces thereof with an elongate pocket 73 which extends in the sliding direction of the slide 71, and a plurality of T-shape grooves 74 branch from the elongate pocket 73 at each side thereof, as best shown in FIG. 16. Each of the T-shape grooves 74 is composed of a head portion groove 75 parallel to the elongate pocket 73 and a leg portion groove 76 transverse thereto for communication of the head portion groove 75 with the elongate pocket 73. The head portion groove 75 is smaller in depth than the elongate pocket 73, and the leg portion groove 76 is further smaller in depth than the head portion groove 75.

A guiding base 77 slidably guiding the slide 71 is formed therein with a supply passage 78, which opens to face the elongate pocket 73. The supply passage 78 has fitted therein a throttle element 80 at an end portion where it opens to the elongate pocket 73.

Figure 18:
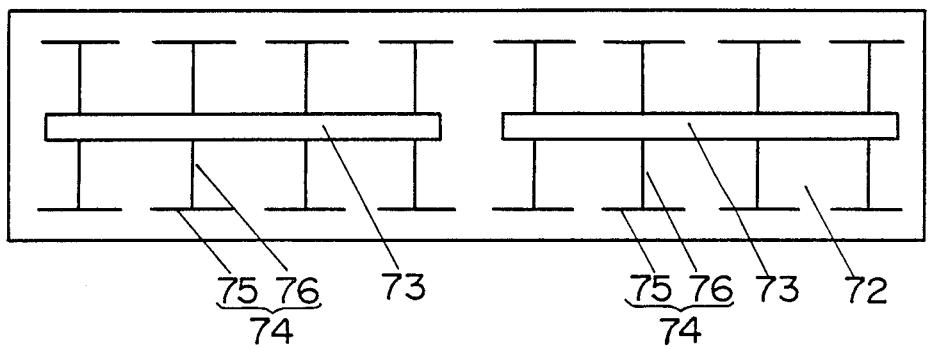
FIG. 18 is a bottom view of a sliding surface of a slide in an eighth embodiment according to the present invention.
Figure 19:
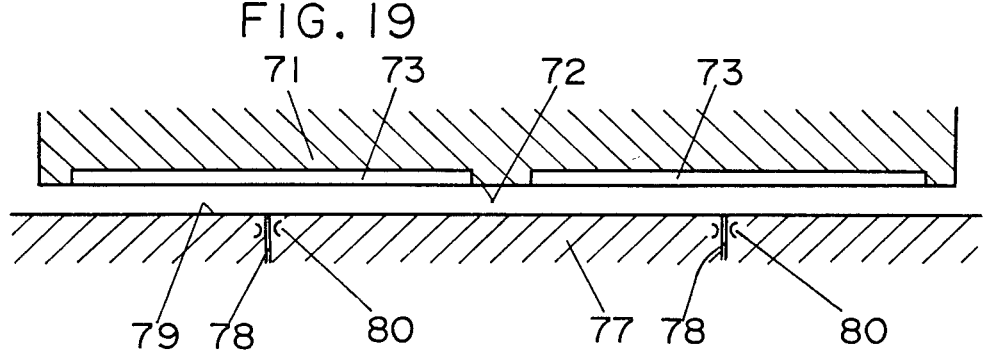
FIG. 19 is a longitudinal sectional view of the eighth embodiment.

In the case where the slide 71 is sufficiently long compared with the sliding stroke thereof as is true in an eighth embodiment of the present invention shown in FIGS. 18 and 19, it is desirable to arrange several elongate pockets 73 of a suitable length in the sliding direction of the slide 71. In this case, supply passages 78 of the same number as the pockets 73 and each having a throttle element 80 are provided in the guiding base 77 in correspondence to the elongate pockets 73. The rigidity in supporting the slide 71 against pitching motion during sliding movement can be improved by doing so.

In the seventh and eighth embodiments as constructed above, when pressurized lubrication oil is supplied from an oil supply (not shown) to the supply passage 78 in the guiding base 77, it is conducted to the elongate pocket 73 of the slide 71 through the throttle element 80 and then, is conducted to the head groove portion 75 of each T-shape groove 74 after being regulated by the leg portion groove 76 thereof. The lubrication oil then flows out of each head portion groove 5 through a clearance between the guiding surface of the guiding base 77 and the sliding surface of the slide 71 so as to be collected into the oil supply. Consequently, the slide 71 is slidably supported by virtue of hydrostatic pressures forces which are generated in the elongate pocket 73 as well as in the head portion grooves 75 of the T-shape grooves 74.

By the way, if the hydrostatic forces to support the slide 71 depend solely on surface throttles constituted by the leg portion grooves 76, in other words, if the throttle element 80 is not provided, the supporting rigidity of the slide 71 is low because of the throttling mechanism of the surface throttles 76. More specifically, even if the clearance between the guiding and sliding surfaces of the guiding base 77 and the slide 71 is set small for securing a required supporting rigidity, pressurized lubrication oil from the oil supply directly acts in the elongate pocket 73. This causes the guiding base 77 to be deformed whereby the clearance between the guiding and sliding surfaces is varied or increased. As is well known in the art, the supporting rigidity of the device of this kind is drastically lowered due to a slight change or increase of the clearance.

However, in the seventh and eighth embodiments of the present invention, hydrostatic pressure forces are generated not only in the elongate pocket 73 but also in the head portion grooves 75 of the T-shape grooves 74 because the leg portion grooves 76 act as throttle elements which varies their opening areas depending upon the vertical movement of the slide 71. Thus, the slide 71 is supported by the both of the hydrostatic pressure forces in the elongate pocket 73 and the head portion grooves 75. Unlike those using the surface throttles 76 only, these illustrated embodiments enable the required supporting rigidity to be secured even when the pressure in the supply pocket 73 is set by the throttle element 80 to a relatively low pressure. Moreover, since the relatively low pressure within the elongate pocket 73 avoids the deformation of the guiding base 77, substantial variation does not take place regarding the clearance between the guiding and sliding surfaces of the guiding base 77 and the slide 71, so that the decrease of the supporting rigidity can be avoided. It is one of the outstanding advantages of these embodiments that the arrangement of T-shape grooves 74 at the both side of the elongate pocket 73 provides an enhanced corner rigidity against the possible rocking motion of the slide 71 about the longitudinal axis of the elongate pocket 73.

Obviously, numerous modifications and variations of the present invention are possible in light of the above teachings. It is therefore to be understood that within the scope of the appended claims, the present invention may be practiced otherwise than as specifically described herein.

What is claimed is:

1. A hydrostatic slide supporting device comprising;
   a guiding member having a guiding surface;
   a slide slidably mounted on said guiding member and having a sliding surface which is slidably engaged with said guiding surface of said guiding member;
   a plurality of hydrostatic pressure pockets formed on said sliding surface of said slide;
   an elongate supply groove formed on said sliding surface of said slide and extending in the sliding direction of said slide;
   first passage means for providing fluid communication of said elongate supply groove with said plurality of hydrostatic pressure pockets; and
   second passage means formed in said guiding member and opening at a position on said guiding surface where said second passage means is able to always communicate with said elongate supply groove irrespective of the sliding position of said slide on said guiding member.

2. A hydrostatic slide supporting device as set forth in claim 1, wherein said sliding surface of said slide comprises:
   a plurality of flat surface lands respectively encircling said plurality of hydrostatic pressure pockets and said elongate supply groove; and
   a surface around said flat surface lands and receding away from said guiding surface of said guiding member.

3. A hydrostatic slide supporting device as set forth in claim 2, wherein:
   each of said flat surface lands is defined by a wall of a substantially uniform thickness.

4. A hydrostatic slide supporting device as set forth in claim 1, wherein:
   said plurality of hydrostatic pressure pockets are arranged in the sliding direction of said slide; and
   said elongate supply groove is formed in parallel relation with an array of said plurality of hydrostatic pressure pockets.

5. A hydrostatic slide supporting device as set forth in claim 4, wherein said first passage means includes a plurality of passage holes respectively opening to said plurality of hydrostatic pressure pockets, further comprising:
   a plurality of throttle elements respectively fitted in said plurality of passage holes.

6. A hydrostatic slide supporting device as set forth in claim 1, wherein:
   said elongate supply groove extends at the center of said sliding surface;
   said plurality of hydrostatic pressure pockets includes a first array of fluid pockets arranged at one side of said elongate supply groove in the sliding direction of said slide and a second array of fluid pockets arranged at the other side of said elongate supply groove in the sliding direction of said slide; and
   said first passage means includes a plurality of passage grooves formed on said sliding surface of said slide for respectively providing fluid communications of said first and second arrays of fluid pockets with said elongate supply groove.

7. A hydrostatic slide supporting device as set forth in claim 6, wherein:
   each of said passage grooves is smaller in depth than each of said hydrostatic pressure pockets.

8. A hydrostatic slide supporting device as set forth in claim 7, wherein:
   the depth of said passage grooves is determined to enable the same to act as throttle elements for restricting the flow of pressurized fluid from said elongate supply groove to each of said hydrostatic pressure pockets.

9. A hydrostatic slide supporting device as set forth in claim 6, wherein:
   each of said first and second arrays of said hydrostatic pressure pockets includes a plurality of small rectangular fluid pockets which are arranged in line and in parallel relation with said elongate supply groove;
   said hydrostatic slide supporting device further comprising:
   a pair of large rectangular hydrostatic pressure pockets formed on said sliding surface respectively at opposite ends of thereof and each extending in a direction transverse to the sliding direction of said slide;
   said sliding surface being formed with portions which define a pair of lands respectively encircling said pair of large rectangular hydrostatic pressure pockets, each of said lands having a substantially uniform thickness and also having the same height as a portion which defines said elongate supply groove, said first and second arrays of small rectangular hydrostatic pressure pockets and said plurality of passage grooves;
   said first supply means further including passage means formed in said slide for providing fluid communication of said elongate supply groove with said pair of large rectangular hydrostatic pressure pockets; and
   a pair of throttle elements respectively fitted in end portions of said passage means which open to said large rectangular hydrostatic pressure pockets.

10. A hydrostatic slide supporting device comprising:
    a guiding member providing a first pair of flat guiding surfaces extending in parallel relation with each other and a second pair of flat guiding surfaces perpendicular to an associated one of said first pair of guiding surfaces and extending in mutually face to face relation and in parallel relation with each other;
    a slide slidably guided on said guiding member and having a first pair of sliding surfaces respectively in slidable engagement with said first pair of flat guiding surfaces and a second pair of sliding surfaces respectively in slidable engagement with said second pair of flat guiding surfaces;
    a plurality of hydrostatic pressure pockets formed on each of said first pair of sliding surfaces and arranged in the sliding direction of said slide;
    an elongate supply groove formed on each of said second pair of sliding surfaces and extending at the center of each of said second pair of sliding surfaces in the sliding direction of said slide;
    a first array of small hydrostatic pressure pockets formed on each of said second pair of sliding surfaces alongside said elongate supply groove at one side thereof;
    a second array of small hydrostatic pressure pockets formed on each of said second pair of sliding surfaces alongside said elongate supply groove at the other side thereof;

a plurality of branch grooves formed on each of said second pair of sliding surfaces for respectively providing fluid communication of said first and second arrays of small hydrostatic pressure pockets with said elongate supply groove;

first passage means formed in said slide for respectively providing fluid communications of said large hydrostatic pressure pockets with an associated one of said elongate supply groove; and a pair of second supply passages formed in said guiding member and respectively opening to said pair of second guiding surfaces for respectively providing fluid communications with said elongate supply grooves irrespective of the sliding position of said slide.

11. A hydrostatic slide supporting device as set forth in claim 10, wherein said first passage means includes a plurality of passage hole portions which respectively open to said large hydrostatic pressure pockets, further comprising:

a plurality of throttle elements respectively fitted in said plurality of passage hole portions for regulating the pressures within said large hydrostatic pressure pockets independently of one other.

12. A hydrostatic slide supporting device as set forth in claim 11, wherein:

each of said branch grooves has a smaller depth than an associated one of said small hydrostatic pressure grooves so as to act as a variable throttle element which regulates the hydrostatic pressure within said associated one of said small hydrostatic pressure grooves independently of any other of said small hydrostatic pressure grooves.

* * * * *